United States Patent

[11] 3,582,950

| [72] | Inventors | Mitsuo Tanaka;<br>Masao Kamimura, both of Kokubunji-shi, Japan |
|---|---|---|
| [21] | Appl. No. | 824,620 |
| [22] | Filed | May 14, 1969 |
| [45] | Patented | June 1, 1971 |
| [73] | Assignee | Hitachi, Ltd.<br>Tokyo, Japan |
| [32] | Priority | May 17, 1968, Aug. 7, 1968 |
| [33] | | Japan |
| [31] | | 43/32891 and 43/55515 |

[54] TRACKING ANTENNA SYSTEM
8 Claims, 10 Drawing Figs.

[52] U.S. Cl............................................. 343/113, 343/100, 343/117, 343/786, 343/858
[51] Int. Cl............................................. G01s 3/04
[50] Field of Search........................................ 343/100.3, 113, 16, 16 SD, 786, 858

[56] References Cited
UNITED STATES PATENTS
| 3,259,899 | 7/1966 | Cook............................. | 343/100(.3)X |
| 3,383,688 | 5/1968 | Renaudie....................... | 343/113 |

Primary Examiner—Rodney D. Bennett, Jr.
Assistant Examiner—Richard E. Berger
Attorney—Craig, Antonelli, Stewart & Hill ABSTRACT: A tracking antenna system capable of detecting a difference between the direction of an incoming wave and that of the boresight axis of an aperture antenna of the system and capable of detecting the direction of polarization of the incoming signal. The system comprises a sampling coupler for selectively leading out a particular one of the higher modes excited in a circular waveguide connected with the antenna and comprises an angular error signal processing circuit in association with the sampling coupler.

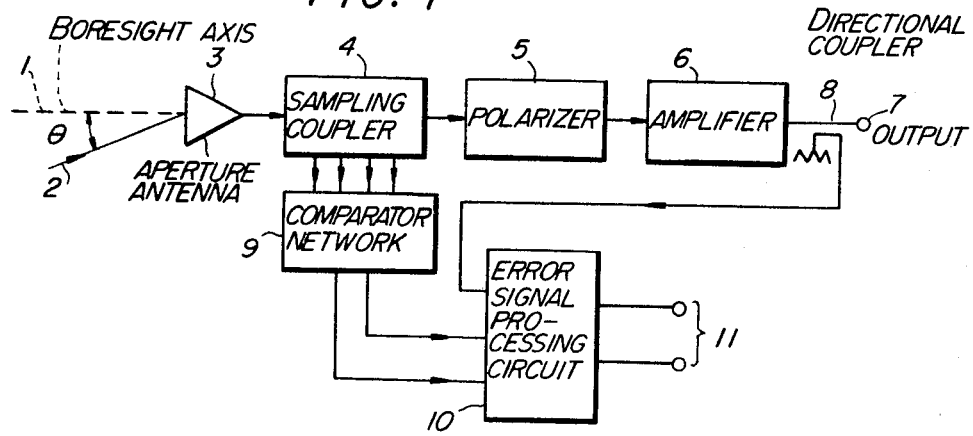
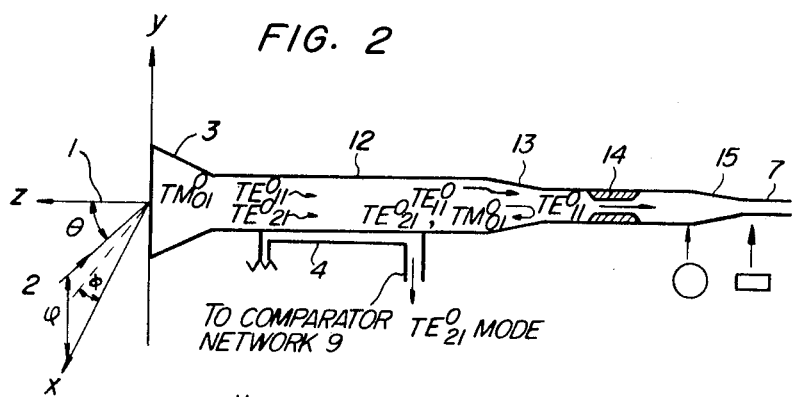
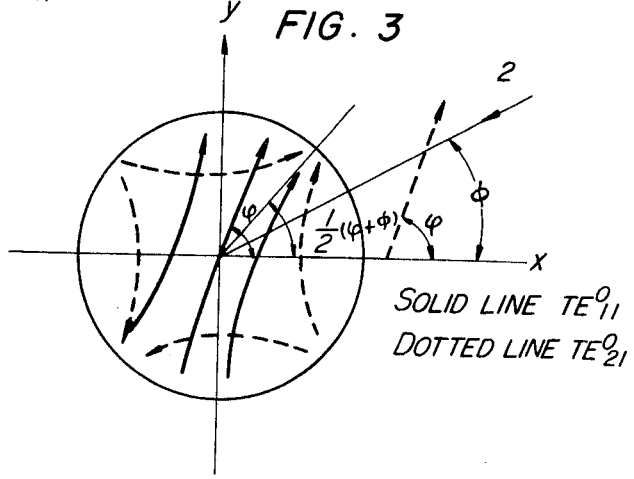

TRACKING ANTENNA SYSTEM

BACKGROUND OF THE INVENTION

1. Field of the Invention

The present invention relates to tracking antenna systems having a function of detecting a difference between the direction of an incoming wave and the direction of the boresight axis of an antenna and of detecting the direction of polarization of the incoming wave.

2. Description of the Prior Art

A ground station antenna for use in space communications should be capable of receiving ought to receive very weak electromagnetic waves, so that for such a ground station antenna use must be made of an antenna having a sharp directivity and a high gain. Thus, in structure, the range in which the sensitivity of such an antenna is maximum or substantially maximum is limited to a narrow one. In order to keep the sensitivity of the antenna maximum whenever receiving incoming waves in various directions, it is necessary to turn the antenna with high accuracy so as to make the boresight axis of the antenna concurrent with the directions of the incoming waves, i.e., so as to track the incoming waves. For example, with an antenna having a gain as large as 55 db. in the direction of the boresight axis, even a deviation as small as 0.2° from the boresight axis would cause a decrease of the order of a few db. in the signal to noise ratio (S/N ratio) which will lead to unsatisfactory performance no matter how well the antenna might have been designed. It is, therefore, required that the antenna should have the function of automatically detecting the angular difference between the direction of the boresight axis of the antenna and the direction of an incoming wave and minimizing the angular difference by means of a control section to which an error signal corresponding to the angular difference is fed.

Heretofore, various systems have been proposed for detecting the direction of an incoming signal and providing an angular error signal representative of the direction of the incoming signal, which are briefly classified into two types.

In the first type of system, a single aperture antenna is used, higher modes excited in the antenna are detected and from the detected higher modes an angular error signal is derived. Meanwhile, in the second type of system, a plurality of antennas are used and from the amplitudes or phase differences of waves received by the respective antennas an angular error signal is derived.

In an example of the first type of system, an angular error signal is derived by way of a coupler in which are detected one of the higher modes $TM_{01}$ and the dominant mode $TE_{11}^0$ of a circular waveguide to be excited in proportion to an angular difference, i.e., a boresight angle (or elevation angle) $\theta$ between the direction of the boresight axis of an antenna and the direction of an incoming wave. If, however, the incoming wave is linearly polarized there must exist a direction which, however, can not be detected by this type of system. For the purpose of obviating this deficiency there is another example of the first type system having been considered, in which another higher mode $TE_{21}^0$ wave is led out (as disclosed in Japanese Pat. Publication No. 2914/1968), but since the latter example makes use of differences in mode field configuration of higher mode waves with respect to the dominant mode wave in order to detect an angular error signal, the output of an angular error signal detecting section of the system may include $TE_{21}^0$ mode wave component which is accompanied by a dominant mode wave component. Therefore, the latter example is defective in that it causes a considerably greater insertion loss of a communication signal when applied to a communication system where no beacon signal is presented in any bandwidth that is out of the communication band for the communication signal. The same thing is true of the case in which use is made of the $TM_{01}$ mode wave as in the above-mentioned example.

The second type of system, being constituted by a plurality of antennas in combination, has the advantage of being able to derive an angular error signal without the above-mentioned problem, but has such a drawback that the electrical lengths of and the insertion losses of the respective feeders connected to the plurality of antennas need to be exactly identical with one another for a satisfactory operation of the system. Even a slight difference in the electrical length between the feeders would readily affect the angular error signal to be obtained, which results in a false operation, i.e., the directions pointed by the antennas are inconsistent with those of the boresight axis of the antennas. Furthermore, since the communication signal is received by the combination of a plurality of antennas, the received signals at the respective antenna have to be combined through matrix circuits which would necessarily bring about a loss of the gain of the system, and in the case of any various polarized wave reception a plurality of polarizers are needed.

SUMMARY OF THE INVENTION

The primary object of the present invention is to provide an antenna system having the function of detecting a difference between the direction of an incoming wave and that of the boresight axis of an antenna and of detecting the direction of the polarization of the incoming signal wave thereby to produce an angular error signal in association with the detected difference, obviating the above-mentioned drawbacks and deficiencies.

In accordance with the present invention, it is possible to provide or produce an angular error signal without affecting the communication signal and to obtain an angular error signal with respect to an incoming signal which does not include a beacon signal and to provide an antenna system including an angular error signal producing circuit the output signal of which does not interfere with the communication signal. Also, it is possible to eliminate the situation in which an angular error signal can not be produced with respect to an incoming linearly polarized wave.

Briefly, the tracking antenna system of the present invention comprises a single aperture antenna; a feeder waveguide connected with the aperture antenna and transmitting those waves of a plurality of higher modes waves excited within the waveguide which have amplitudes substantially in proportion to the angle formed by the direction of an incoming wave and the direction of the boresight axis of the antenna; means for deriving a communication signal from the waveguide; a directional coupler consisting of a plurality of coupling arms provided on the waveguide for deriving from the waveguide only one of the higher mode waves, making use of differences in the propagation velocities of a dominant $TE_{11}^0$ mode wave and of the higher modes waves within the waveguide; and a signal processing circuit for processing the output from the coupler, thereby detecting the direction of the incoming signal.

BRIEF DESCRIPTION OF THE DRAWINGS

FIG. 1 is a block diagram showing an example of the structure of a tracking antenna system in accordance with an embodiment of the present invention.

FIG. 2 is a plan view briefly showing an antenna section and an antenna feeder section constituting the system of FIG. 1.

FIG. 3 is a diagram illustrating the manner in which the mode waves excited by an incoming signal.

DESCRIPTION OF THE PREFERRED EMBODIMENTS

Figure 4:
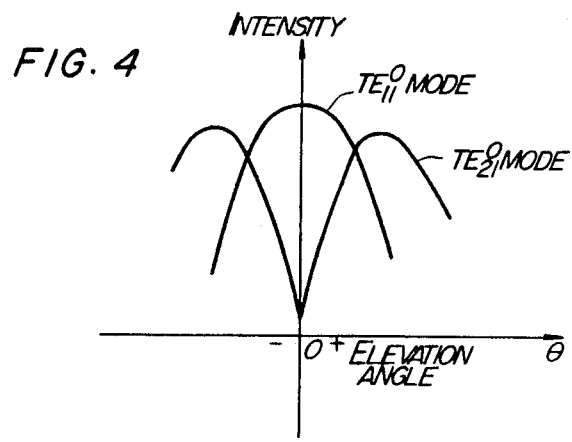
FIG. 4 is a characteristics diagram showing the relation between the incident angle (elevation angle) with respect to the direction of the boresight axis of the antenna and the intensity of excitation.

Referring to FIG. 1 in which the structure of an embodiment of the present invention is illustrated in the form of a block diagram, reference numeral 1 denotes the direction of the boresight axis of a single aperture antenna 3 or the direction of a maximum sensitivity of the antenna; 2, the direction of an incoming signal; and 4, a sampling coupler for deriving only one of the components of higher mode waves excited by the antenna which has an amplitude in proportion to the incident angle $\theta$ (elevation angle) formed by the direction of the incoming wave and that of the boresight axis of the antenna. Such components may be, for example, $TE_{21}^0$ and $TM_{01}^0$ modes. Reference numeral 5 denotes a polarizer; 6, an amplifier; 7, a communication output terminal; 8, a directional coupler; 9, a comparator network or a clockwise counterclockwise polarized wave separation circuit; 10, an angular error signal processing circuit; and 11, angular error signal output terminals. In this embodiment use is made of $TE_{21}^0$ mode of the various higher modes since it is particularly suitable for an angular error signal production.

In FIG. 2 being a schematic diagram of the antenna 3 and the sampling coupler 4, it is assumed that the diameter of a circular waveguide 12 connected to the antenna 3 is such that allows transmission or passage of only $TE_{11}^0$ and $TE_{21}^0$ modes.

FIG. 3 illustrates an example of the electric field configuration excited in the aperture plane (and also in the circular waveguide) by an incoming wave received at an incident angle (or elevation angle) of $\theta$ with respect to the maximum sensitivity direction 1 of the antenna (FIG. 1). In FIG. 3, a system of coordinates are established such that the $x-y$ plane involves the aperture plane and is in parallel with the plane of the drawing while the $z$-axis is the maximum sensitivity direction of the antenna and is perpendicular to the plane of the drawing. The received incoming wave is linearly polarized with the direction of polarization such that the latter when projected to the $x-y$ plane forms an angle $\Phi$ (hereinafter referred to as polarized angle) with respect to $x$-axis and when projected to $x-z$ plane forms an angle $\Phi$ (hereinafter referred to as azimuth angle) with respect to $x$-axis. Thus, the direction of the incoming wave is represented as $(\theta, \Phi)$ in the spherical coordinates system. When an incoming wave is received, the electric field configuration excited in the aperture plane of the antenna or in the waveguide (indicated by a circle in FIG. 3) is represented as a sum of a plurality of proper modes, but in the present embodiment attention has to be drawn only to the dominant $TE_{11}^0$ mode and $TE_{21}^0$ mode of various higher modes. For this purpose, the diameter of the waveguide may be determined so as to excite only $TE_{21}^0$ of the various higher modes besides the dominant mode, as has been assumed above. In FIG. 3, for the sake of convenience, only the $TE_{21}^0$ mode is indicated for higher modes, and the solid and dotted lines within the circle illustrate the electrical field configurations of the $TE_{11}^0$ mode and the $TE_{21}^0$ mode components respectively. It is seen that the direction of polarization of the $TE_{11}^0$ mode wave is concurrent with that of the incoming signal (as defined by $\Phi$) while the polarized angle $\delta$ of the $TE_{21}^0$ mode wave is one-half of the sum of the polarized angle $\Phi$ of the incoming signal and the azimuth angle $\theta$ of the incoming signal, i.e., $\delta = (\frac{1}{2})(\Phi + \Phi)$. Meanwhile, the excitation intensities of the $TE_{21}^0$ mode and $TE_{11}^0$ mode waves become such as the curves shown in FIG. 4 with respect to the elevation angle $\theta$. Namely, when the elevation angle $\theta$ is relatively small, the excitation intensity of the $TE_{11}^0$ mode wave is almost constant and that of the $TE_{21}^0$ mode wave is proportionate to the elevational angle $\theta$. Therefore, it can be understood that in order to detect the direction of an incoming signal, the directions of polarization of the dominant mode and a higher mode of the wave excited by the incoming wave as defined by $\Phi$ and $\delta$ and the excitation intensity of the $TE_0^0$ mode wave must be determined.

The polarized angle $\Phi$ is known from the rotation angle for the polarizer 5 illustrated in FIG. 1. In other words, the polarized angle $\Phi$ is varied or adjusted in the polarizer 5 so as to effectively excite $TE_{11}^0$ mode wave, which has been excited within the feeder waveguide 12, in another waveguide 7 integrally and fixedly connected with the waveguide 12. As for the polarized angle $\delta$, it can be determined by comparing the $TE_{21}^0$ mode wave components derived from the outputs of at least two coupling arms provided on the sampling coupler. The elevation angle $\theta$ with respect to the $z$-axis can be determined through the excitation intensity of the $TE_{21}^0$ mode wave. Thus, all of the elevation angle $\theta$ with respect to $z$-axis, the polarized angle $\Phi$ and the azimuth angle $\Phi$ can be determined.

In FIG. 2, the sampling coupler 4 is associated with the feeder circular waveguide 12 so as to derive therefrom only the $TE_{21}^0$ mode components which have amplitudes in proportion to the incident or elevation angle $\theta$. Of the excited waves in the waveguide 12, only the $TE_{11}^0$ mode component is derived as a communication signal by means of a taper portion 13, an isolator 14 and a rectangular waveguide 7 all integrally provided with the waveguide as shown.

In order to perform the above-recited functions, it is significant to separate with a high accuracy the dominant $TE_{11}^0$ mode component from a higher $TE_{21}^0$ or $TM_{01}^0$ mode component which involves information concerning the elevation angle $\theta$. This separation technique determines the accuracy or quality of the performance of the entire tracking antenna system of the present invention. The directional sampling coupler of the distributed coupling type in the present invention has realized the separation technique. The structure of the directional sampling coupler and that of a signal processing circuit for the output signal from the directional coupler will next be described.

Figure 5A:
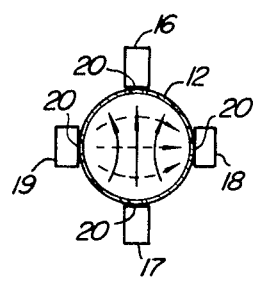
FIGS. 5a and 5b are a plan view and a side view of the sampling coupler used in the embodiment of FIG. 1 respectively.
Figure 5B:
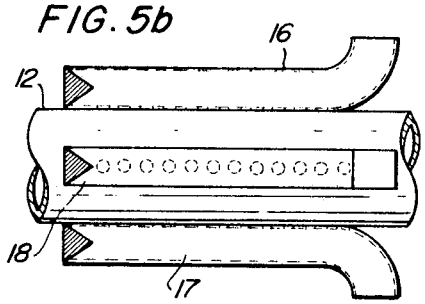

FIGS. 5a and 5b 0 schematic plan and side views of a sampling coupler having the above-mentioned function. This sampling coupler is a distributed coupling type and operates to take out only desired mode components (in this embodiment, $TE_{21}^0$ mode component) and almost reject the dominant $TE_{11}^0$ mode component. The sampling coupler is constituted by placing at least one pair of coupling arms, which may be rectangular waveguides, at such positions on the periphery of the circular waveguide 12 that they are opposed to each other with respect to the central axis of the circular waveguide 12 and are equally spaced apart from adjacent ones. In this embodiment there are provided tow pairs of rectangular waveguide 16—19. One pair of the rectangular waveguides 16 and 17 are magnetically coupled with the circular waveguide 12 (Hz coupling) while the other pair 18 and 19 are electrically coupled with the circular waveguide 12 (H$\Phi$ coupling). At each boundary between the coupling arms or rectangular waveguides 16—19 and the feeder circular waveguide 12 are formed a series of holes 20 for effecting a distributed coupling of the rectangular waveguides 16—19 with the circular waveguide 12 so that the resulting sampling coupler may be provided with a mode selecting characteristic. More specifically, in order to effectively select only the $TE_{21}^0$ mode component out of the circular waveguide 12, the following relation should be established among the width $a$ of the cross section of the rectangular waveguide 16, the diameter D of the feeder circular waveguide 12 and the eigen-value $x_{21}$ of the $TE_{21}^0$ mode wave:

$$2a \approx \pi D / x$$

By establishing this, the $TE_{21}^0$ mode wave can be effectively caused to propagate to the coupling arms 16—19. The outputs of the coupling arms 16 and 17 and those of the coupling arms 18 and 19 are combined to produce respective composite outputs. Then, the two composite outputs are further combined to produce a resultant output. In combining these outputs, the $TE_{21}^0$ mode component is promoted while a small amount of the $TE_{11}^0$ mode component which has leaked into the coupling arms is cancelled, so that the separation between the $TE_{21}^0$ mode and $TE_{11}^0$ mode components is ensured.

Figure 6A:
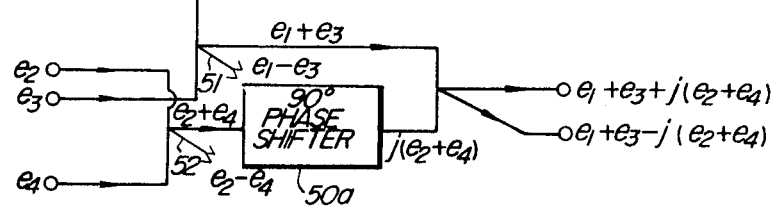
FIGS. 6a and 6b are systematic block diagrams of counterclockwise and clockwise polarized waves separation circuits.
Figure 6B:
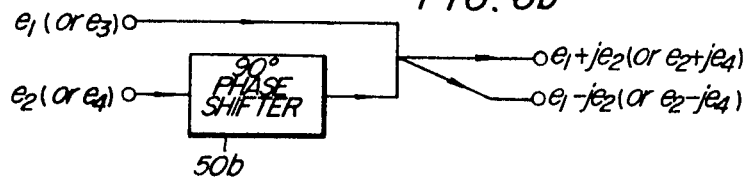

Referring to FIG. 6a briefly showing an example of the structure of the comparator network or clockwise counterclockwise polarized waves separation circuit 9, $e_1$, $e_2$, $e_3$ and $e_4$ represent the outputs of the four coupling arms 16, 17, 18 and 19 respectively. Of course these are $TE_{21}{}^0$ mode components derived from the circular waveguide 12. As illustrated, from the outputs $e_1$ and $e_3$ is produced a composite output component ($e_1+e_3$) and from the outputs $e_2$ and $e_4$ is produced another composite output component ($e_2+e_4$). The latter composite output component is phase shifted by 90° by means of a 90°-phase shifter 50a to produce $j$ ($e_2+e_4$) component. From the first composite output component ($e_1+e_3$) and the 90°-phase shifted composite output component $j$ ($e_2+e_4$), a clockwise polarized wave component $[e_1+e_3+j(e_2+e_4)]$ and a counterclockwise polarized wave component $[e_1+e_3-j(e_2+e_4)]$ are obtained. It may be noted that the undesirable components ($e_1-e_3$) and ($e_2-e_4$) which sometimes appear along with the ($e_1+e_3$) and ($e_2+e_4$) components can easily be absorbed by resistive terminators 51 and 52 since they must be zero in principle but are actually present though very small in amount. The comparator network or the wave separation circuit 9 may be constructed as shown in FIG. 6b, using only one of the two pairs of the coupling arms 16—19, i.e., using either two outputs $e_1$ and $e_3$ or those $e_2$ and $e_4$. As in the case of FIG. 6a, the $e_2$ (or $e_4$) component is phase shifted to $je_2$ (or $je_4$) by a phase shifter 50b so that a clockwise polarized wave component ($e_1+je_2$) or ($e_3+je_4$) and a counterclockwise polarized wave component ($e_1-je_2$) or ($e_3-je_4$) may be produced.

Assuming that the clockwise polarized wave component and the counterclockwise polarized wave component of the $TE_{21}14^{21}$ mode from the comparator network 19 are represented by $E_1$ and $E_2$ respectively, they are:

$$E_1 = A\theta \cos(\omega t + \Phi) \quad (1)$$

$$E_2 = A'\theta \cos(\omega t + 2\Phi - \Phi) \quad (2)$$

where $\omega$ is the angular frequency of an incoming wave, $t$ is time, and $A$ and $A'$ are constants proper to the clockwise polarized wave and counterclockwise polarized wave and determined by the amplitude of the incoming wave and the distance between the antenna and the wave source.

On the other hand, as shown in FIG. 1, a portion of the communication signal $TE_{11}{}^0$ mode component is derived from the output end of the amplifier 6 through the directional coupter 8. This $TE_{11}{}^0$ mode component is what has been excited in the feeder circular waveguide 12. Assuming that the $TE_{11}{}^0$ mode component is represented by $E_3$, it is:

$$E_3 = B \cos \omega t \quad (3)$$

where $B$ is a constant indicative of the amplitude of the $TE_{11}{}^0$ mode component.

Using those three kinds of outputs $E_1$, $E_2$ and $E_3$ thus obtained, the angular error signal processing circuit 10 shown in FIG. 1 is capable of producing an output in proportion to $x$ (i.e., $\theta \cos \Phi$) component of and another component in proportion to $y$ (i.e., $\theta \sin \Phi$) component of an angular error with respect to z-axis (i.e., the boresight axis of the antenna) with which error the incoming signal is received.

Figure 7:
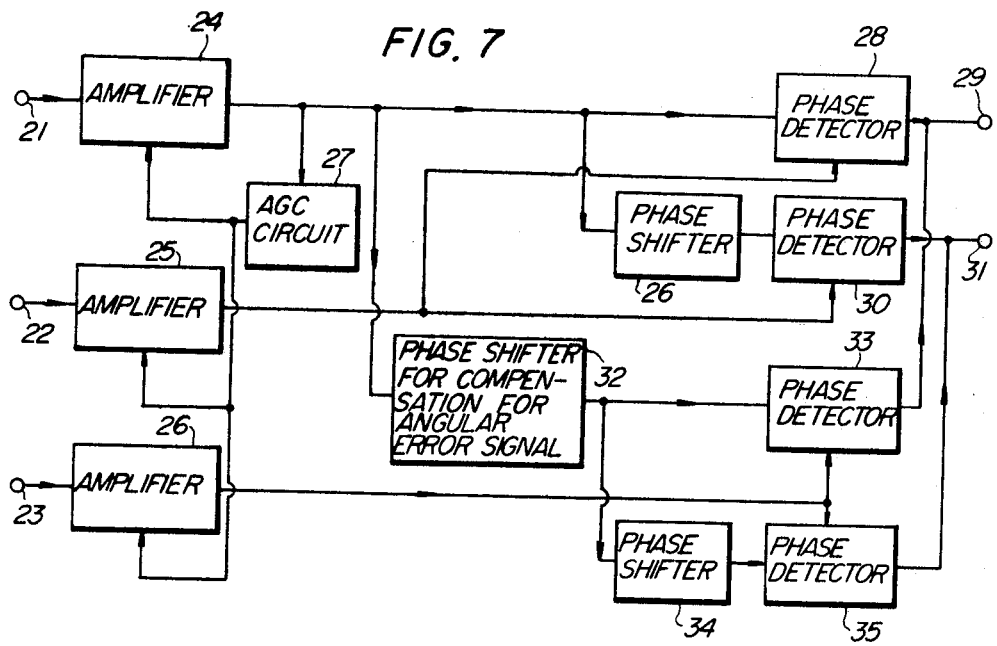
FIG. 7 is a block diagram of an angular error signal processing circuit.

FIG. 7 shows an example of the angular error signal processing circuit in the form of a block diagram. To terminals 21, 22 and 23 are coupled the output $E_3$ or the $TE_{11}{}^0$ mode component, the error signal output $E_1$ or the clockwise polarized wave component of the $TE_{21}{}^0$ mode wave and the error signal $E_2$ or the counterclockwise polarized wave component of the $TE_{21}{}^0$ mode wave respectively. Reference numerals 24, 25 and 26 are amplifiers for amplifying the signals fed to the terminals 21, 22 and 23, the outputs of which amplifiers are normalized by an automatic gain control circuit 27 to which a portion of the output of the amplifier 24 is supplied. A portion of the output of the amplifier 24, which is apparently the ($\cos \omega t$) component as mentioned above, is also applied directly to a phase detector 28 as one input thereto. A portion of the output of the amplifier 25 which is the clockwise polarized wave $\theta \cos(\omega t + \Phi)$ component in $TE_{21}{}^0$ mode is applied to the phase detector 28 as the other input thereto. As a result, in the phase detector 28 a product of $\theta \cos(\omega t + )\cdot \cos \omega t = (\frac{1}{2})\theta[\cos(2\omega t + \Phi) + \cos \Phi]$ is induced and the output of the detector 28 will be only the ($\theta \cos \Phi$) component of the product. Meanwhile, another portion of the output of the amplifier 24 is fed to the 90°-phase shifter 26, which in turn produces an output being a function of ($\sin \omega t$), and the output of the phase shifter 26 is applied to another phase shifter 30 as an input thereto. The second input to the phase shifter is fed from a portion the output of the amplifier 25 with a result that a ($\theta \sin \theta$) component is produced as an error signal at its output terminal 31 in accordance with the similar principle to the case of the phase detector 28. Further, another portion of the output of the amplifier 32 is supplied to a phase detector 32 for compensation for angular error signal, which detector 32 in turn produces an output which is a function of $\cos(\omega t + 2\Phi)$. A portion of the output of the phase detector 32 is fed to another phase detector 33 while another portion of the output of the phase detector 32 is fed to a phase shifter 35 the output of which is connected to a phase detector 35. The phase detectors 34 and 35 operate to produce corresponding error outputs which are functions of ($\theta \cos \Phi$) and ($\theta \sin \Phi$) respectively. These outputs are all fed to a boresight angle control means so that the error signal outputs may be finally zero.

Figure 8:
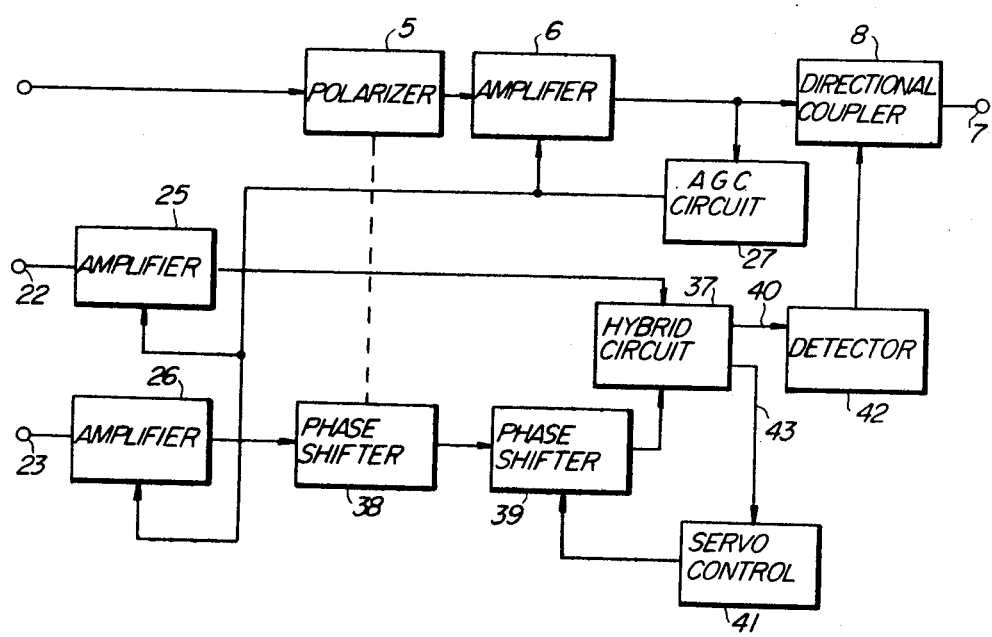
FIG. 8 is a block diagram of a modified angular error signal processing circuit.

Referring to FIG. 8 being a block diagram showing another example of the structure of the error signal processing circuit, reference numerals 5, 6, 7 and 8 denote similar parts presented in FIG. 1, i.e., a polarizer, an amplifier, an output terminal and a directional coupler. Numerals 22 and 23 denote similar parts presented in FIG. 6, i.e., terminals to which the error signal $E_1 = A\theta \cos(\omega t + \Phi)$ or the clockwise polarized wave component of the $TE_{21}{}^0$ mode wave and the error signal $E_2 = A'\theta \cos(\omega t + 2\Phi - \Phi)$ or the counterclockwise polarized wave component of the $TE_{21}{}^0$ mode wave are coupled respectively. Numerals 24 and 25 denote amplifiers, the outputs of which are normalized by the automatic gain control circuit 27. The normalized output of the amplifier 25 is directly introduced into a hybrid circuit 37, while the normalized output of the amplifier 26 is fed to the hybrid circuit 37 through phase shifters 38 and 39. The phase shift amount $\Phi_1$ by the phase shifter 38 is variable being in an interlocked relation with the polarizer 5 and is so related with the polarized angle $\Phi$ as $\Phi_1 = 2\Phi$. One of the outputs 40 of the hybrid circuit 37 provides a detector 42 with a signal including information as to the elevation angle $\theta$ and the other one 43 provides a servocontrol 41 for a servomechanism with a control signal. In case the phase adjustment is not satisfactory, the servocontrol is provided with a DC control signal converted from the output 43 of the hybrid circuit 37 which is other than zero in such a case, in order that the phase shift amount $\Phi_2$ of the phase shifter 39 is adjusted so as to make the output of the servomechanism zero. Namely, when the output of the circuit 41 is zero, $\Phi_2$ becomes concurrent with the azimuth angle $\Phi$, thus effecting detection of the direction of the incoming wave. As can be seen from the block diagrams of FIGS. 7 and 8, the construction of the circuit is advantageously simplified.

Although in the above-described embodiments $TE_{21}{}^0$ mode wave excited in the feeder circular waveguide is derived as a signal carrying information as to the elevation angle $\theta$, the present invention is in no way limited thereto but any other higher mode such as $TM_{90}{}^0$ may be selectively derived for the same purpose. Clearly, in so doing, the structure of the sampling coupler should be modified accordingly.

Further, by placing the polarizer between the antenna and the sampling coupler so that higher modes of waves such as $TE_{21}{}^0$ mode may propagate and $TE_{11}{}^0$ mode wave may be subjected a rotation of the plane of polarization in the polarizer. In this case, the separation of the $TE_{21}{}^0$ mode by the distributed type sampling coupler is almost as large as —60 db. with respect to the elevation angle $\theta$ being in the vicinity of 0°, which leads to a satisfactory operation of the antenna system.

According to the present invention, the following advantages are provided.

a. An angular error signal can easily and effectively be produced irrespective of whether an incoming wave is linearly, elliptically, circularly or otherwise polarized.
b. An insertion loss by the error signal producing section from which loss a communication signal in the tracking system must suffer is extremely low as compared with the case of the conventional system.
c. Little amount of undesirable reflected waves from the tracking system are introduced into the communication signal amplifiers.
d. The operative bandwidth is very broad as a result of using a distributed coupling type sampling coupler.
e. The accuracy is very high.

It is apparent that various other modifications of embodiments are possible without departing from the spirit of the present invention.

We claim:
1. Tracking antenna system capable of detecting the direction and polarization of an incoming wave comprising:
   one aperture antenna;
   a circular waveguide connected to the antenna and exciting a dominant mode $TE_{11}^0$ and higher modes having information as to the direction of the incoming wave therein;
   means for leading out a communication signal from the waveguide;
   distributed-coupling-type sampling coupler means including at least two pairs of coupling arms mounted on the waveguide for selectively leading out only a higher mode from the waveguide without affecting said dominant mode;
   a comparator network connected to the outputs of the two pairs of coupling arms of the sampling coupler means; and
   a signal processing circuit for detecting the direction of the incoming wave from the output of the comparator network.

2. Tracking antenna system as defined in claim 1, wherein each of said coupling arms is a rectangular waveguide, and the width $a$ of the rectangular waveguide, the diameter D of the circular waveguide and the eigen-value $x$ of the selectively led out higher mode are in the following relation $2a \approx \pi D/x$.

3. Tracking antenna system as defined in claim 1, wherein the selectively led out higher mode is $TE_{21}^0$ mode.

4. Tracking antenna system as defined in claim 3, wherein two pairs of coupling arms are arranged at coordinate diametrical positions of the circular waveguide, one pair of coupling arms being electrostatically coupled to the circular waveguide, and the other pair of counter coupling arms being magnetically coupled to the circular waveguide.

5. Tracking antenna system as defined in claim 1, wherein the selectively led out higher mode is $TM_{01}^0$ mode.

6. Tracking antenna system as defined in claim 1, wherein the aperture antenna and the circular waveguide are connected through a variable polarizer which can polarize the dominant $TE_{11}^0$ mode and pass the higher modes without polarization.

7. Tracking antenna system as defined in claim 1, wherein the comparator network is composed of a circuit means capable of separating the selectively led out higher mode into a clockwise polarized wave component and a counterclockwise polarized wave component.

8. Tracking antenna system as defined in claim 7, wherein the signal processing network comprises:
   a first input terminal to be provided with the separated clockwise polarized wave component signal from the comparator network;
   a second input terminal to be provided with the separated counterclockwise polarized wave component signal from the comparator network; and
   a hybrid circuit to which the signal at the first terminal is directly supplied and to which the signal at the second terminal is fed through first and second phase shifters so as to produce an output including information concerning the elevation angle of the incoming wave and another output serving as a control signal to be supplied to a servocontrol means;
   the amount of phase shift by the first phase shifter being controlled in an interlocked relation with the driving of the polarizer; and
   the amount of phase shift by the second phase shifter being controlled by the said another output of the hybrid circuit so that the said another output may become zero.